US009660804B2

(12) United States Patent
Liu et al.

(10) Patent No.: US 9,660,804 B2
(45) Date of Patent: May 23, 2017

(54) METHODS AND APPARATUS FOR GENERATING KEYS IN DEVICE-TO-DEVICE COMMUNICATIONS

(71) Applicant: Nokia Technologies Oy, Espoo (FI)

(72) Inventors: Yang Liu, Beijing (CN); Da Jiang Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/898,881

(22) PCT Filed: Jun. 26, 2013

(86) PCT No.: PCT/CN2013/078054
§ 371 (c)(1),
(2) Date: Dec. 16, 2015

(87) PCT Pub. No.: WO2014/205697
PCT Pub. Date: Dec. 31, 2014

(65) Prior Publication Data
US 2016/0134418 A1     May 12, 2016

(51) Int. Cl.
*H04L 9/08*           (2006.01)
*H04W 12/04*     (2009.01)
(Continued)

(52) U.S. Cl.
CPC .......... *H04L 9/0819* (2013.01); *H04L 9/083* (2013.01); *H04L 63/062* (2013.01);
(Continued)

(58) Field of Classification Search
CPC .................................................. H04L 9/0819
See application file for complete search history.

(56) References Cited

U.S. PATENT DOCUMENTS 8,799,638 B2 *   8/2014   Ogata ................. H04L 63/0428
                                                          713/150
9,363,090 B1 *   6/2016   Paczkowski ............ H04L 63/10
(Continued)

FOREIGN PATENT DOCUMENTS

CN          102984699 A     3/2013
WO        2008095308 A1    8/2008
(Continued)

OTHER PUBLICATIONS

Shamir et al.; How to share a secret; Published in: Magazine Communications of the ACM CACM Homepage archive; vol. 22 Issue 11, Nov. 1979; pp. 612-613; ACM Digital Library.*
(Continued)

*Primary Examiner* — Bradley Holder
(74) *Attorney, Agent, or Firm* — Nokia Technologies Oy

(57) ABSTRACT

Methods and apparatus are provided for securing device-to-device communications. A method can comprise: at an access network apparatus, obtaining from a core network apparatus and storing a first key shared between a first user equipment and the core network apparatus for device-to-device communications of the first user equipment; receiving from a second user equipment, a request for generating a second key for a device-to-device communication between the first user equipment and the second user equipment; in response to the request, generating the second key based on the first key and security parameters; and sending the second key to the second user equipment.

9 Claims, 6 Drawing Sheets

(51) Int. Cl.
*H04L 29/08* (2006.01)
*H04W 60/00* (2009.01)
*H04W 76/02* (2009.01)
*H04L 29/06* (2006.01)
*H04W 92/18* (2009.01)

(52) U.S. Cl.
CPC ........... *H04L 67/104* (2013.01); *H04W 12/04* (2013.01); *H04W 60/00* (2013.01); *H04W 76/023* (2013.01); *H04L 2209/80* (2013.01); *H04L 2463/061* (2013.01); *H04W 92/18* (2013.01)

(56) References Cited

U.S. PATENT DOCUMENTS

| | | | | |
|---|---|---|---|---|
| 2002/0186846 | A1* | 12/2002 | Nyberg | H04L 9/0841 380/273 |
| 2007/0179898 | A1* | 8/2007 | Medvinsky | H04L 63/0428 705/59 |
| 2008/0075291 | A1* | 3/2008 | Kamijoh | H04L 9/0836 380/279 |
| 2008/0226065 | A1* | 9/2008 | Zunke | H04L 9/0822 380/30 |
| 2008/0298328 | A1 | 12/2008 | Sharma | |
| 2009/0060189 | A1* | 3/2009 | Osajima | H04L 9/0833 380/259 |
| 2009/0232301 | A1* | 9/2009 | Li | H04L 9/0838 380/44 |
| 2011/0268275 | A1* | 11/2011 | Singhal | H04L 63/0428 380/270 |
| 2014/0013101 | A1* | 1/2014 | Tanizawa | H04L 9/0838 713/150 |

FOREIGN PATENT DOCUMENTS

| | | |
|---|---|---|
| WO | 2011047956 A1 | 4/2011 |
| WO | 2011/117677 A1 | 9/2011 |
| WO | 2012/137633 A1 | 10/2012 |
| WO | 2014/161155 A1 | 10/2014 |

OTHER PUBLICATIONS

Lei et al.; Operator controlled device-to-device communications in LTE-advanced networks; Published in: IEEE Wireless Communications ( vol. 19, Issue: 3, Jun. 2012 ); Date of Publication: Jul. 4, 2012.*

International Search Report and Written Opinion received for corresponding Patent Cooperation Treaty Application No. PCT/CN2013/078054, dated Apr. 3, 2014, 12 pages.

Extended European Search Report received for corresponding European Patent Application No. 13888415.0, dated Dec. 21, 2016, 9 pages.

"D2D Direct Link Key Requirement", 3GPP TSG SA WG3 (Security) Meeting #71, S3-130356, Agenda Item: 7.13, Huawei, Apr. 8-12, 2013, 3 pages.

* cited by examiner

400

> at an access network apparatus, obtain from a core network apparatus and store a first key shared between a first user equipment and the core network apparatus for device-to-device communications of the first user equipment; ⟵ 410

> receive from a second user equipment, a request for generating a second key for a device-to-device communication between the first user equipment and the second user equipment; ⟵ 420

> in response to the request, generate the second key based on the first key and security parameters ⟵ 430

> send the second key to the second user equipment. ⟵ 440

FIG. 4

METHODS AND APPARATUS FOR GENERATING KEYS IN DEVICE-TO-DEVICE COMMUNICATIONS

RELATED APPLICATION

This application was originally filed as Patent Cooperation Treaty Application No. PCT/CN2013/078054 filed Jun. 26, 2013.

FIELD OF THE INVENTION

The present invention generally relates to network-controlled device-to-device communications. More specifically, the invention relates to enhanced methods for generating cryptography keys in device-to-device (herein after also referred to as "D2D") communications and related apparatus.

BACKGROUND

With the development of the future service, next generation wireless communication systems, such as 3GPP (third Generation Partnership Project) LTE (long term evolution) and beyond system, IMT-A (International Mobile Telecommunications—Advanced) system etc., are introduced to satisfy high speed, large capacity, and a high QoS (Quality of Service) for billions of subscribers. In this regard, efforts have been made to realize network-controlled D2D communications for reducing the load on the cellular communication network. Examples of such D2D communications include direct communications among a cluster of proximity devices, and autonomous D2D communications in a cellular network. In such network-controlled D2D communications, devices such as user equipments (UE) or terminals directly communicate with each other, instead of conveying data from one device to the other via the cellular network (in particular via an access node or base station thereof), wherein primary control and configurations, such as channel/bearer configurations, can be carried out by the cellular network.

Security protection may be an issue for the network-controlled D2D communications, for example, because malicious users may be able to eavesdrop on the D2D communication if no strong security protection between peer UEs conducting a direct D2D communication is used. According to the current security mechanism, the key generation for network-controlled D2D communications are managed and controlled by the core network. The core network, especially apparatus for key management (such as MME (Mobility Management Entity), HSS (Home Subscriber Server), and/or the like) needs to be involved in an establishment and key negotiation of every D2D connection. This may highly increase the signaling burden of the core network, for example in a case that the number of UEs conducting D2D communications is huge.

In view of this, it would be advancement in the art to provide a way to decrease a signaling burden of a core network in a key generation of D2D communications.

SOME EXAMPLE EMBODIMENTS

To overcome limitations described above, and to overcome other limitations that will be apparent upon reading and understanding the present specification, the disclosure provides an approach for generating cryptography keys in D2D communications without introducing too much signaling burden to a core network.

According to one embodiment, a method comprises deriving at a first user equipment, a first key based on a first security parameters and a key shared between a core network apparatus and the first user equipment. The method further comprises sending a notification of device-to-device services to a second user equipment. The method further comprises receiving a second security parameter from the second user equipment, wherein the second security parameter is a parameter for generating a second key based on the first key by an access network apparatus to which the first user equipment is registered. The method further comprises deriving at the first user equipment, the second key based on the second security parameter and the first key, for protecting a device-to-device communication between the first user equipment and the second user equipment.

In some exemplary embodiments, deriving the first key comprises sending a request message to the core network apparatus, indicating a capability of device-to-device communication of the first user equipment; and receiving the first security parameters from the core network apparatus. The first user equipment can return to idle mode after receiving the first security parameters.

In some exemplary embodiments, the method can further comprise registering the first user equipment to the access network apparatus with a location information of device-to-device registration area of the first user equipment.

According to another embodiment, an apparatus comprising at least one processor, and at least one memory including computer program code, the at least one memory and the computer program code configured to, with the at least one processor, cause, at least in part, the apparatus to derive at a first user equipment, a first key based on a first security parameters and a key shared between a core network apparatus and the first user equipment. The apparatus is further caused to send a notification of device-to-device services to a second user equipment. The apparatus is further caused to receive a second security parameter from the second user equipment, wherein the second security parameter is a parameter for generating a second key based on the first key by an access network apparatus to which the first user equipment is registered. The apparatus is further caused to derive at the first user equipment, the second key based on the second security parameter and the first key, for protecting a device-to-device communication between the first user equipment and the second user equipment.

According to another embodiment, a computer-readable storage medium carrying one or more sequences of one or more instructions which, when executed by one or more processors, cause, at least in part, an apparatus to deriving at a first user equipment, a first key based on a first security parameters and a key shared between a core network apparatus and the first user equipment; sending a notification of device-to-device services to a second user equipment; receiving a second security parameter from the second user equipment, wherein the second security parameter is a parameter for generating a second key based on the first key by an access network apparatus to which the first user equipment is registered; and deriving at the first user equipment, the second key based on the second security parameter and the first key, for protecting a device-to-device communication between the first user equipment and the second user equipment.

According to another embodiment, an apparatus comprises means for deriving at a first user equipment, a first key based on a first security parameters and a key shared between a core network apparatus and the first user equipment. The apparatus also comprises means for sending a notification of device-to-device services to a second user equipment. The apparatus also comprises receiving a second security parameter from the second user equipment, wherein the second security parameter is a parameter for generating a second key based on the first key by an access network apparatus to which the first user equipment is registered. The apparatus also comprises deriving at the first user equipment, the second key based on the second security parameter and the first key, for protecting a device-to-device communication between the first user equipment and the second user equipment.

According to one embodiment, a method comprises at an access network apparatus, obtaining from a core network apparatus and storing a first key shared between a first user equipment and the core network apparatus for device-to-device communications of the first user equipment. The method further comprises receiving from a second user equipment, a request for generating a second key for a device-to-device communication between the first user equipment and the second user equipment. The method further comprises in response to the request, generating the second key based on the first key and security parameters. The method further comprises sending the second key to the second user equipment.

In some exemplary embodiments, the method can further comprise accepting a registration of the first user equipment; and storing the first key in associated with a location information of device-to-device registration area of the first user equipment. In some exemplary embodiments, the method can further comprise sending the security parameters to the second user equipment, so that at least part of the security parameters are forwarded to the first user equipment. In some exemplary embodiments, the method can further comprise removing the first key from the access network apparatus after the first user equipment moved out of the registration area managed by the access network apparatus.

In an exemplary embodiment, the request for generating the second key can indicate that the second key is to be used for a device-to-device communication between the first user equipment and the second user equipment, and can comprise an identity of the first user equipment. The access network apparatus can be an enhanced Node B or a device-to-device registration server function server.

According to one embodiment, a method comprises receiving at a core network apparatus, a request for generating a first key for device-to-device communications of a user equipment. The method further comprises in response to the request, generating the first key based on a key shared between the core network apparatus and the user equipment and security parameters. The method further comprises sending the security parameters to the user equipment. The method further comprises sending the first key to an access network apparatus to which the first user equipment is registered.

In an exemplary embodiment, the request can indicate a capability of device-to-device communication of the user equipment. The security parameters can be transmitted from the core network apparatus to the access network apparatus together with the first key and the identity of the user equipment in a same message. The core network apparatus can be a mobility management entity.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a flowchart of a process of key generation for a network-controlled D2D communication, according to one embodiment;

DESCRIPTION OF SOME EMBODIMENTS

Figure 1:
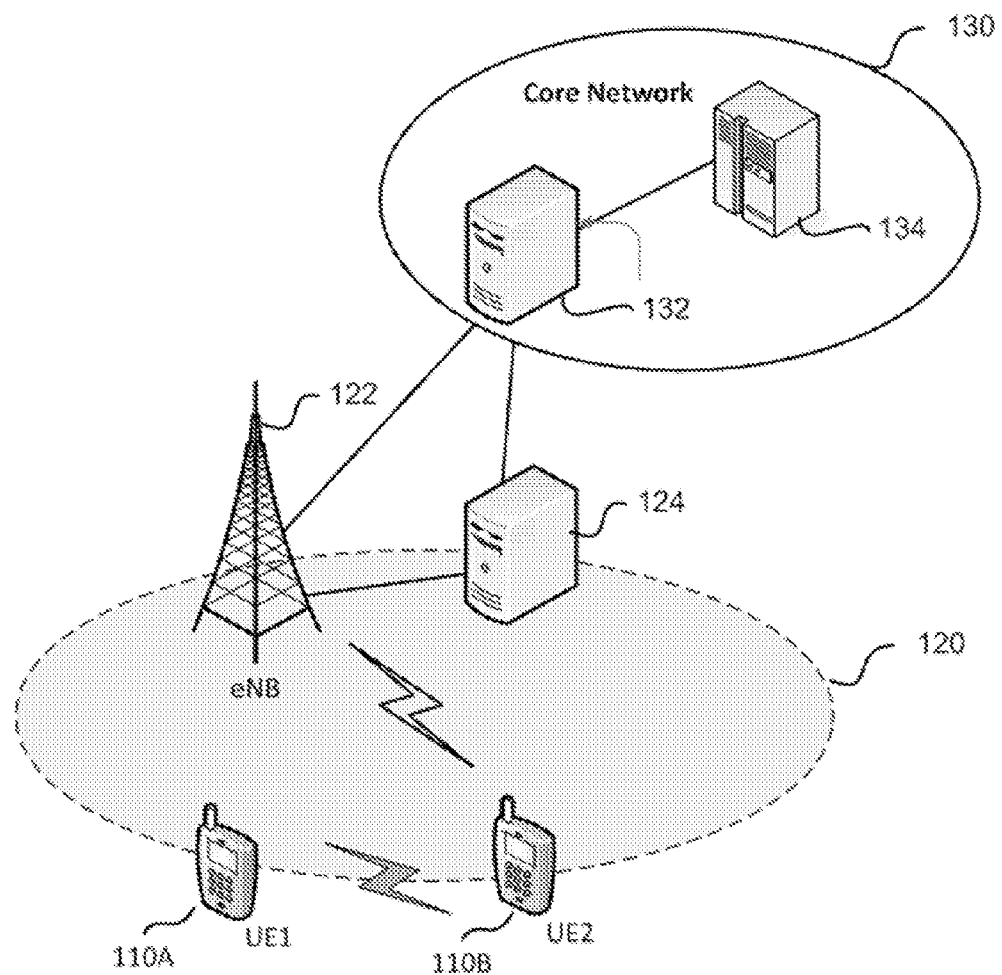
FIG. 1 is a wireless communication system in which at least one embodiment of the present invention can be implemented.

Examples of a method, apparatus, and computer program for generating cryptography keys in D2D communications without introducing too much burden to a core network are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Like reference numerals refer to like elements throughout.

FIG. 1 is a wireless communication system in which at least one embodiment of the present invention can be implemented. Generally, a wireless communication system includes a radio access network and a core network. The radio access network controls a cell and certain UEs operating within that cell, to provide a wireless access to the core network. As shown in FIG. 1, a radio access network 120 can comprises a base station 122, which can support a corresponding service or coverage area (also referred to as a cell). The base station 120 is also capable of communicating with wireless devices, such as user equipments 110A, 110B, within the coverage area. Although FIG. 1 depicts one base station 122 and two user equipments 110A, 110B in the radio access network 120, other quantities of base stations and user equipments may be implemented as well.

In some implementations, the base station 120 can be implemented as an evolved Node B (eNB) type base station consistent with standards, including the Long Term Evolution (LTE) standards. The user equipments 110A, 110B may be mobile and/or stationary. Moreover, the user equipments 110A, 110B may be referred to as, for example, devices, mobile stations, mobile units, subscriber stations, wireless terminals, terminals, or the like. The user equipment may be implemented as, for example, a wireless handheld device, a wireless plug-in accessory, or the like. For example, the user equipment may take the form of a wireless phone, a computer with a wireless connection to a network, or the like. In some cases, the user equipment may include one or more of the following: at least one processor, at least one computer-readable storage medium (e.g., memory, storage, and the like), a radio access mechanism, and a user interface.

The core network 130 comprises the conventional network elements and function of a cellular communication network, such as MME 132 (Mobility Management Entity), HSS (Home Subscriber Server) 134, etc. Network elements in the core network can be organized in a basic structure and operate in a basic way well known to one skilled in the art.

In embodiments of the present invention, the wireless communication system 100 is configured to further support network-controlled D2D communications. In this regard, a D2D feature is integrated into the public land mobile systems, such as the 3rd Generation Partnership Project (3GPP) as well as subsequent generations of cellular communication systems. The cellular communication systems, such as the eNB 122, MME 132 or other network elements, may be used to aid in the establishment and ongoing control of the D2D communications, e.g., radio resources allocation of the D2D communications, switch control, etc. In other words, the UEs can communicate with each other either via the cellular communication system (in particular via eNB 122), or via a direct D2D communication. As shown at FIG. 1, UE 110A is under control of the eNB 122 and directly communicating with UE 110B.

To make the management for D2D communications more feasible and efficiently, a DRSF (D2D Registration Server Function) server can be introduced for registration, authentication and identification of D2D users. A D2D user in a D2D registration area can register to the DRSF of the D2D registration area with a D2D user ID and a temporary UE ID (e.g. S-TMSI). A DRSF server can be located in a radio access network entity (e.g. eNB) or in core network entity (e.g. MME) or in both with a hierarchical structure. In a case that a DRSF server is located in a radio access network, the DSRF can be implemented in either centralized or distributed way.

For a centralized DRSF, a D2D registration area should be limited within the control area of one RAN element. For instance, if a DRSF server is located in eNB, the D2D registration area can be limited to the cell controlled by one eNB. Having centralized DRSF in one RAN can shorten the time for D2D connection setup as less network entities and signaling are involved in procedures of D2D connection setup, but requires more frequent D2D registration. That is, a D2D registration needs to be performed again when a user equipment moves to a new D2D registration area, e.g. a cell controlled by a new eNB. For distributed DRSF, a D2D registration area can be extended into the coverage area controlled by multiple RAN elements to avoid too frequent D2D registrations. In this case, D2D related control (e.g. D2D paging, D2D connection setup etc.) signaling needs to be traversed over the RAN elements interface (e.g. X2 interface in E-UTRAN).

Traditionally, the security protection of the direct D2D communications is also provided by virtue of the sophisticate security mechanism of the cellular communication system. For example, security key derivations for securing the direct D2D communications can be controlled by the core network including the MME 132 and HSS 134. As shown in FIG. 1, when UE1 is in RRC (Radio Resource Control) idle mode, UE2 will request the core network (e.g. MME 132) to generate a security key for a D2D service between UE1 and UE2. Usually for a given D2D area, there may be lots of D2D UEs operating in D2D service. Hence it will bother the core network 130 (or MME 132) to generate every single security key for respective D2D service, which is a potential challenge from the point of view of the core network. Exemplary embodiments of the invention address how to efficiently support security of network-controlled D2D communication, including how to generate, distribute and update security keys for D2D services with less signaling impact to the core network. Exemplary embodiments conduct such key generation, distribution and update regardless of whether a UE is in RRC connected state or in idle state.

In exemplary embodiments of the invention, a first key for a UE's D2D service can be generated by a MME, and then shared among the UE, the MME and an element(such as an eNB or DRSF) of an access network controlling the UE. The first key can be generated based on a valid security context (e.g. NAS (Non Access Stratum) security context) for the UE maintained in the core network. For example, the MME can generate the first key from a valid Access Security Management Entity key (denoted as $K_{asme}$) for the UE. The first key is stored in the access network, so that security keys for each D2D service initiated by the UE under the control of the access network element can be generated by the access network element based on the first key, without necessity of requesting security keys from the core network for the each D2D service.

Figure 2:
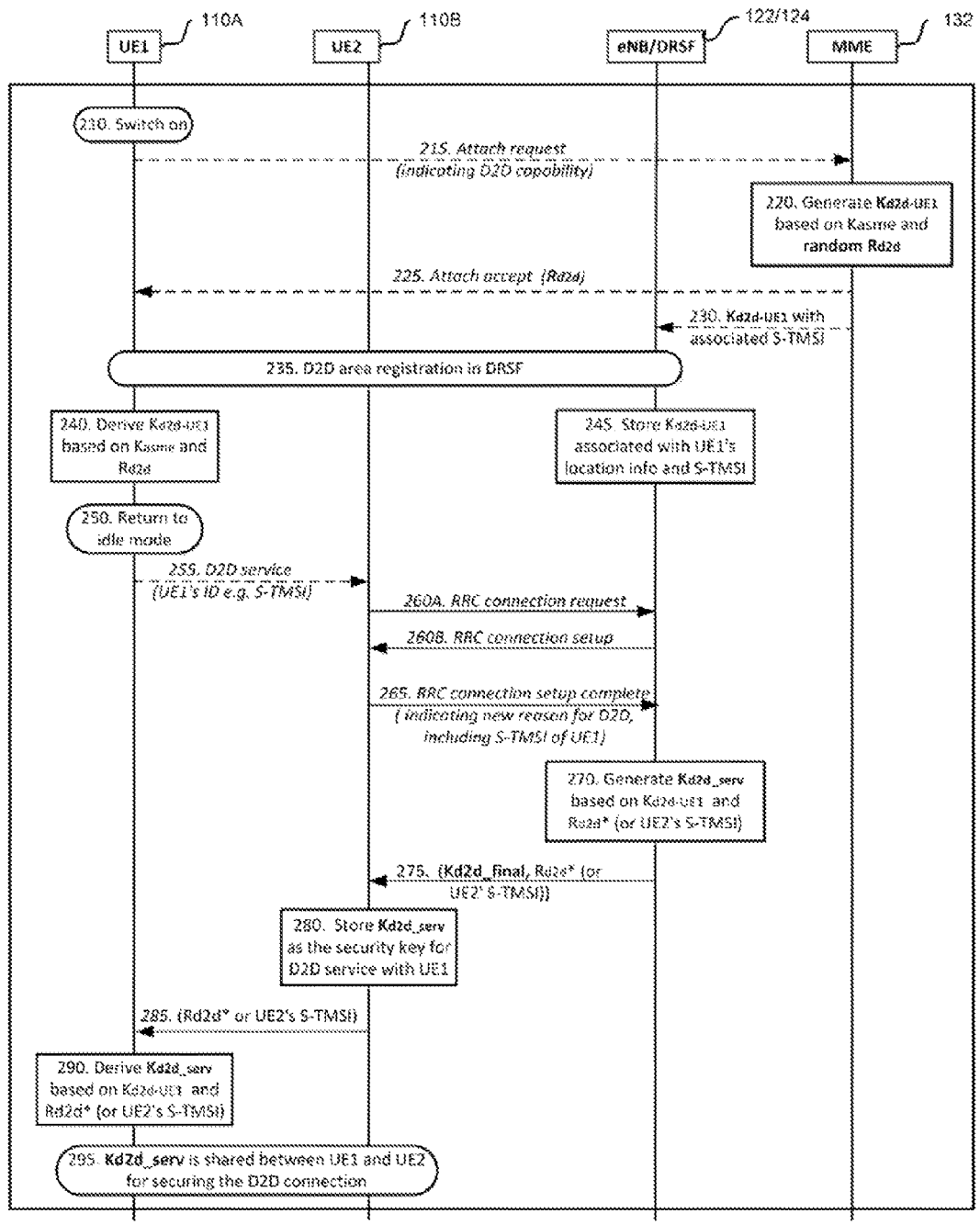
FIG. 2 depicts an example timing diagram illustrating a procedure of key generation between D2D user equipments according to an embodiment of the present invention.

FIG. 2 depicts an example timing diagram illustrating a procedure of key generation between D2D user equipments according to an embodiment of the present invention. Assume for explanation that there is a DRSF server 124 in the radio access network. Although FIG. 1 illustrates the DRSF server 124 as an entity separate and distinct from any of the access network elements, in practice the function of the server 124 may be incorporated in any apparatus (for example in eNB 122) of the access network 120. Referring to FIG. 2, UE1 110A switches on at 210 and initiates an attach procedure to the core network. Then, UE1 can request the MME 132 to generate a first key for D2D services initiated by UE1. For example, UE1 can indicates its D2D capability to MME 132, in the attach request message sent from UE1 110A to MME 132, at 215. Then, at 220, MME 132 can generate a first key (denoted as $K_{d2d\text{-}UE1}$) for UE1 based on a NAS key shared between the UE1 and the MME 132 (e.g. $K_{asme}$ of UE1) together with other security parameter(s), such as a random number denoted $R_{d2d}$. The parameter(s) for deriving the D2D key can be provided or generated according to the identity of UE1. For example, when UE1 first camped on the cell of eNB 122 after power on, the core network (i.e. non-access stratum) can register the UE1 and achieve a consistence of NAS security (e.g. sharing a common NAS key) between the UE1 and the core network. In this regard, there will be a valid NAS security context for UE1 comprising the common NAS key maintained in the core network, for example in MME 132 or HSS 134. For example, the NAS key shared between the UE1 and the MME 132 may be a $K_{asme}$ of UE1, which may be retrieved based on the identity of UE1.

MME 132 can include the security parameter(s) (such as the random number $R_{d2d}$) into an attach accept message which is sent from MME 132 to UE1 110A with NAS level security protected (e.g. ciphering). Meanwhile, at 230, MME can send the $K_{d2d-UE1}$ generated for UE1 together with the UE1's identity, e.g., S-TMSI of UE1, to the eNB 122 (or DRSF 134) where the attach procedure is initiated. Then, the eNB or DRSF can store this information for further usage, as shown at 245. In some exemplary embodiments, the two sets of parameters sent from MME 132 respectively to eNB 122 and UE1 110A can be contained in a same S1AP message, i.e. INITIAL CONTEXT SETUP REQUEST message, so that from the MME's point of view, only one S1AP signaling is used to convey the essential parameters. Based on the shared NAS key $K_{asme}$ and the received the security parameter(s) $R_{d2d}$, the UE1 can derive the first key, for example as shown at 240. As such, the first key can be shared among the UE1, the eNB/DRSF and the MME 132.

Although as illustrated in FIG. 2, the first key is generated and distributed during an attach procedure to the core network, it should be appreciated that in some exemplary embodiments the generation of the first key are not limited to this procedure. For example, the first key can be updated in the MME and provided to UE1 automatically, and/or the first key can be generated in a dedicated procedure initiated by the UE1 or MME.

In parallel to the generation and distribution of the first key, UE1 can register itself to an access network apparatus (such as an eNB or DRSF) which controls the D2D registration area UE1 is currently located in, for D2D services in this D2D registration area. This registration can be performed as D2D area registration. In this embodiment illustrated in FIG. 1, UE1 110A is connected to the core network 130 via the access network 120, and then can register to eNB 122/DRSF 124 with its identity and its location information in a D2D registration area, at 235. The eNB/DRSF can store D2D registration information for associating the first key for UE1 with the identity (e.g. UE1's S-TMSI) and the location information of UE1. It should be appreciated the D2D area registration can occur at any necessary time. In some embodiments the D2D area registration can be performed before or after the generation and distribution of the first key.

Through the D2D registration, UE1 110 A is allowed to conduct D2D services in the D2D registration area under the control eNB 122 and/or DRSF 124. After the attach procedure or D2D area registration, UE1 can return to idle mode, for example for the lowest energy consumption. In other words, there is no RRC connection established between UE1 and eNB 122. For example, UE1 may stay in RRC idle mode as specified in LTE protocols. As a device capable of D2D communication, UE1 can broadcast notifications for D2D services to its adjacent D2D UEs when it wants D2D communications, even if it stays in RRC idle mode. For example at 255, while staying in idle mode, UE1 broadcasts a notification for D2D services. That notification also identifies UE1 as the originator of the D2D services with UE1's identity, e.g. an IMEI (International Mobile Equipment Identity), an IMSI (International Mobile Subscriber Identity), or a S-IMSI (Short-Temporary Mobile Subscriber Identity) of UE1, or other D2D user ID. The identity of UE1 may be allocated to UE1 when UE1 camps on the cell of eNB 122. Although as illustrated in FIG. 2, UE1 is in idle mode while broadcast the notification of D2D services, the notification can also be broadcasted while UE1 is in RRC connected mode.

Then, one or more adjacent D2D UEs (e.g. UE2 110B) may detect the broadcasted notification of D2D service from UE1 and decide to establish a D2D connection with UE1. Based on information in the detected notification, UE2 can obtain the identity information (e.g. S-TMSI) of UE1 and request eNB/DRSF to generate a second key for the D2D connection between UE1 and UE2. In the case that there is no RRC connection between UE2 and the eNB 122, UE2 can initiate a RRC connection setup procedure to eNB 122, as shown at 260A, 260B and 265. Through the established RRC connection, the request for the second key can be send to eNB/DRSF. For example, the identity of UE1 which may be obtained from the received notification at 255, can be transmitted to eNB 122/DRSF 124 in an RRC connection setup complete message at 265, to request eNB 122/DRSF 124 to generate the required D2D security keys. In this example, the eNB is indicated that the RRC connection setup procedure is imitated just for a derivation of D2D keys which is different from the legacy RRC connections. In the legacy way, according to the related specifications, the eNB generally needs to forward the initial UE message (e.g. the request initiated from UE2) to the core network (e.g. MME) after the RRC connection setup procedure. In stead, the forwarding is not necessary in various embodiments of the present invention, because it is due to the eNB/DRSF to generate the second key. In this regard, UE2 can include a new cause value, e.g. "D2D key derivation procedure" in the RRC connection setup complete message, to indicate eNB that the RRC connection setup procedure is merely for a derivation of D2D keys, so that the radio access network and the core network (especially, eNB 122 and MME 132) need not to perform any extra operations beyond enabling the derivation of the second key.

In some exemplary embodiments, UE2 may have an activate RRC connection to the eNB 122 at the moment of deciding to establish a D2D connection with UE1. In that case, it is not necessary to initiate the RRC connection setup procedure. UE2 can stay in a RRC connected mode, and send a request for a derivation of the second key to the eNB/DRSF by utilizing the activate RRC connection between UE2 and eNB 122. As discussed above in relation to the request in the RRC connection setup complete message, this request also comprises the identity of UE1 (e.g. S-TMSI of UE1). Furthermore, UE2 indicates this D2D key generation purpose to eNB/DRSF, so that similarly eNB/DRSF can terminate the procedure at the side of the access network, instead of forwarding this procedure to the side of the core network.

In response to receiving the request for key derivation, eNB 132 or DRSF 134 can provide to UE2 a second key (denoted as $K_{d2d}$) for the D2D connection between UE1 and UE2, and associated security parameters for deriving the second key. In this regard, the eNB/DRSF can identify the first key ($K_{d2d-UE1}$) for UE1 based on the identity of UE1 (e.g UE1's S-TMSI) from the received request. Based on the $K_{d2d-UE1}$ and security parameters, the eNB/DRSF can generate $K_{d2d\_serv}$ at 270, for D2D service integrity protection and ciphering, for example. The associated security parameters for deriving $K_{d2d\_serv}$ may comprise a random number (denoted as $R_{d2d}^*$) generated by the eNB/DRSF and or some parameters associated with UE2, e.g. a temporary identity (e.g. S-TMSI) of UE2. Then, the eNB/DRSF sends the $K_{d2d\_serv}$ to UE2 at 275, together with the associated security parameters (e.g. $R_{d2d}^*$ and/or UE2's S-TMSI), if any.

In some embodiments, the eNB/DRSF can also specify a key derivation function (KDF) utilized for deriving the $K_{d2d\_serv}$, and indicate the KDF to UE1 as a part of the associated security parameters. In this regard, the eNB/DRSF can obtain a security capability of UE1 from the MME. For example, the security capability of UE1 can be sent from MME 132 to eNB/DRSF together with $K_{d2d-UE1}$, at step 230. From the security capability, the eNB/DRSF can learn the algorithms supported by UE1 for generating the key $K_{d2d\_serv}$. The eNB/DRSF can further obtain a security capability of UE2 which is included in the RRC connect request. From the security capability of UE2, the eNB/DRSF can learn the algorithms supported by UE2 for generating the key $K_{d2d\_serv}$. Then, the eNB/DRSF can decide an algorithm to be used for generating a key for the D2D communication between UE1 and UE2, based on UE1 and UE2's security capability. For example, the eNB/DRSF can select an algorithm commonly supported between UE1 and UE2. The eNB/DRSF can send an algorithm ID indicating the selected algorithm to UE2 as part of the associated security parameters, together with the $K_{d2d\_serv}$, at step 275.

At 280, UE2 receives $K_{d2d\_serv}$ and the associated security parameters (e.g. the $R_{d2d}*$ and/or UE2's S-TMSI) for deriving $K_{d2d\_serv}$ from eNB/DRSF, and then stores the $K_{d2d\_serv}$ as the security key for the D2D service with UE1. Then, UE2 forwards the associated security parameters (e.g. the $R_{d2d}*$ and/or UE2's S-TMSI) for deriving the key $K_{d2d\_serv}$ to UE1, as shown at 285. In some embodiments, an algorithm ID indicating the selected algorithm deriving $K_{d2d\_serv}$ can be also forwarded from UE2 to UE1, together with $R_{d2d}*$ and/or UE2's S-TMSI.

With the received security parameters (e.g. the $R_{d2d}*$ and/or UE2's S-TMSI, the selected algorithm ID) from UE2, the UE1 can derive the $K_{d2d\_serv}$ based on the $K_{d2d\text{-}UE1}$ and the security parameters. In this regard, according to the received algorithm ID, the UE1 can use the same KDF as the eNB to derive $K_{d2d\_serv}$. As such, a common D2D cryptography key, $K_{d2d\_serv}$ can be shared between UE1 and UE2 without interrupting the core network. The D2D cryptography key $L_{d2d\_serv}$ can be used directly for securing the D2D communications between UE1 and UE2. Alternatively or additionally, $K_{d2d\_serv}$ can be utilized for deriving other keys which are used for securing the D2D communication between U1 and UE2.

In some embodiments, if UE1 is moving out of the D2D registration area controlled by the eNB or DRSF, the eNB or DRSF can update the location information of UE1 and remove the related security context of UE1, including the $K_{d2d\text{-}UE1}$ and the $K_{d2d\_serv}$. Then, when UE1 come back to the D2D registration area of the eNB/DRSF and eNB/DRSF finds no security context exists for UE1, it can request the core network (e.g. MME) to transfer the context including the first key $K_{d2d\text{-}UE1}$ of UE1. Since MME is always keeping some context information (including security contexts) for UEs, even if the UEs are in idle mode, MME is always able to provide these context information to eNB/DRSF, for example via a request/response procedure.

Although many operations are described in a certain order with reference to FIG. 2, it should be appreciated that these operations can be performed in alternative orders, and some operations can be adjusted, combined, or even omitted. For example, in an example embodiment, the derivation (step 240) of the first key $K_{d2d\text{-}UE1}$ in UE1 110A can occur at any time before the derivation (step 290) of the second key $K_{d2d\_serv}$. Furthermore, the returning to idle mode at 250 may be omitted, the means UE1 110A is not in idle mode when broadcasting the notification of D2D services. In an example embodiment, UE1 110A can request the first key from MME 132 after the D2D area registration. In an example embodiment, eNB/DRSF can request MME 132 for providing the first key of UE1 when the eNB/DRSF find that it is not able to identify the first key, for example when generating the second key $K_{d2d\_serv}$ for UE1 at 270.

In various embodiments, once the access network obtain a first key for D2D communications initiated by UE1, it can generate a second key which is finally used for protecting a D2D connection between UE1 and a peer UE (e.g. UE2). As such, the derivation of a key for each D2D connection can be processed in an access network, without introducing signaling burden to the core network (e.g. MME). The signaling impact to the core network can be decreased significantly, especially in a case where lots of D2D UEs are in D2D services with UE1. Furthermore, without the involvement of the core network or the MME, the delay for the D2D key generation is also shortened comparing with legacy methods, especially for a D2D pair one of which is in idle mode.

Figure 3:
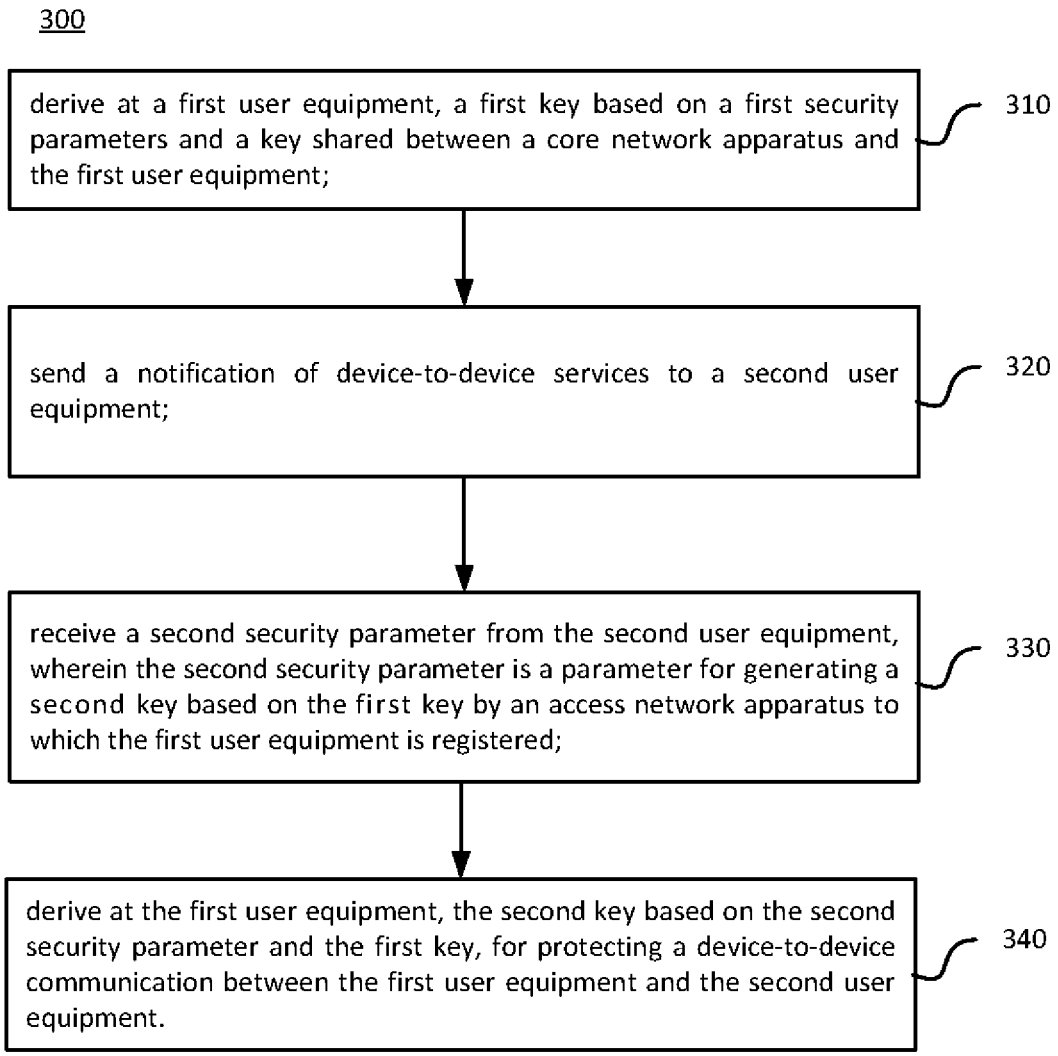
FIG. 3 is a flowchart of a process of key generation for a network-controlled D2D communication, according to one embodiment.
Figure 5:
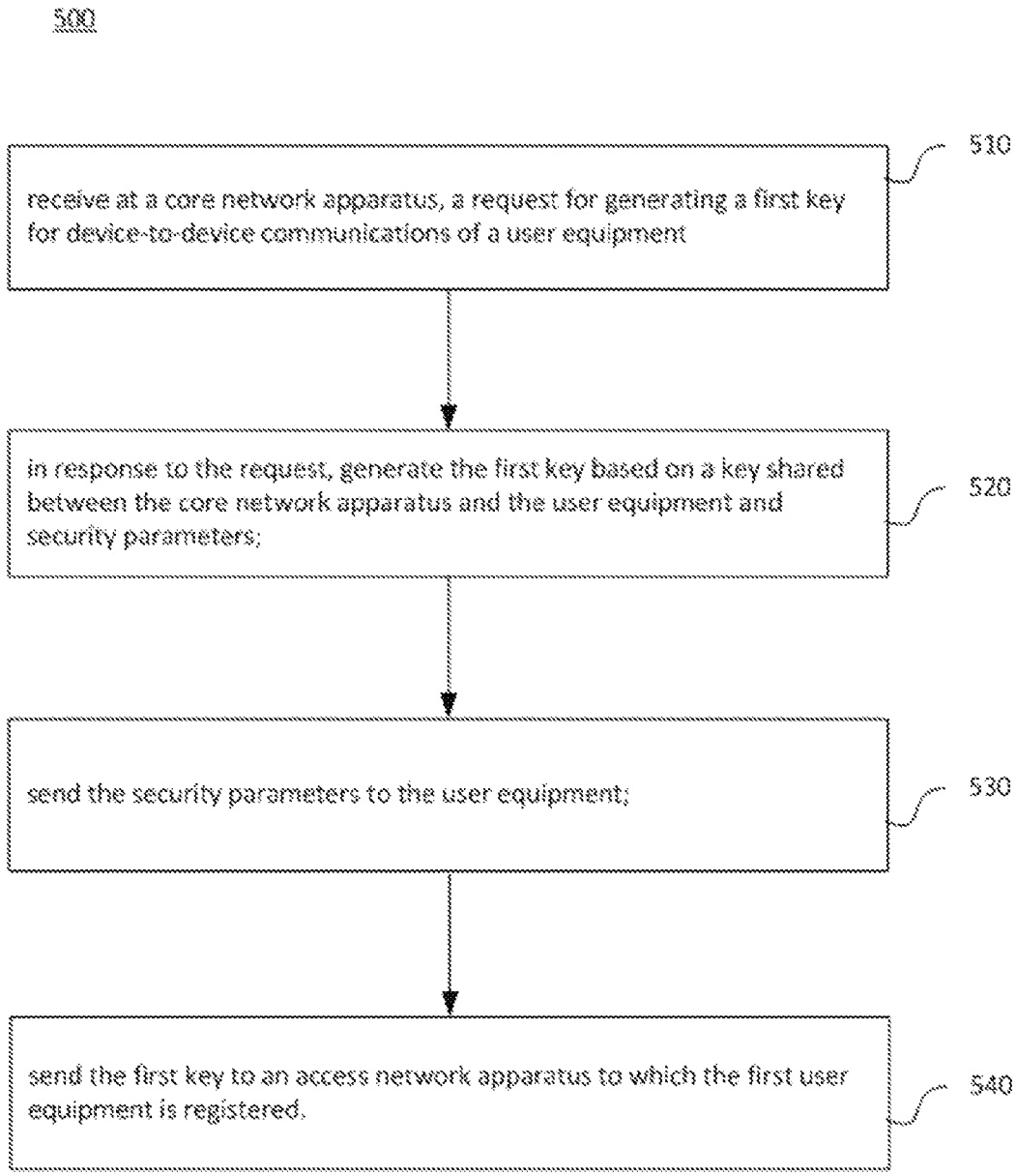
FIG. 5 is a flowchart of a process of key generation for a network-controlled D2D communication, according to one embodiment.
Figure 6:
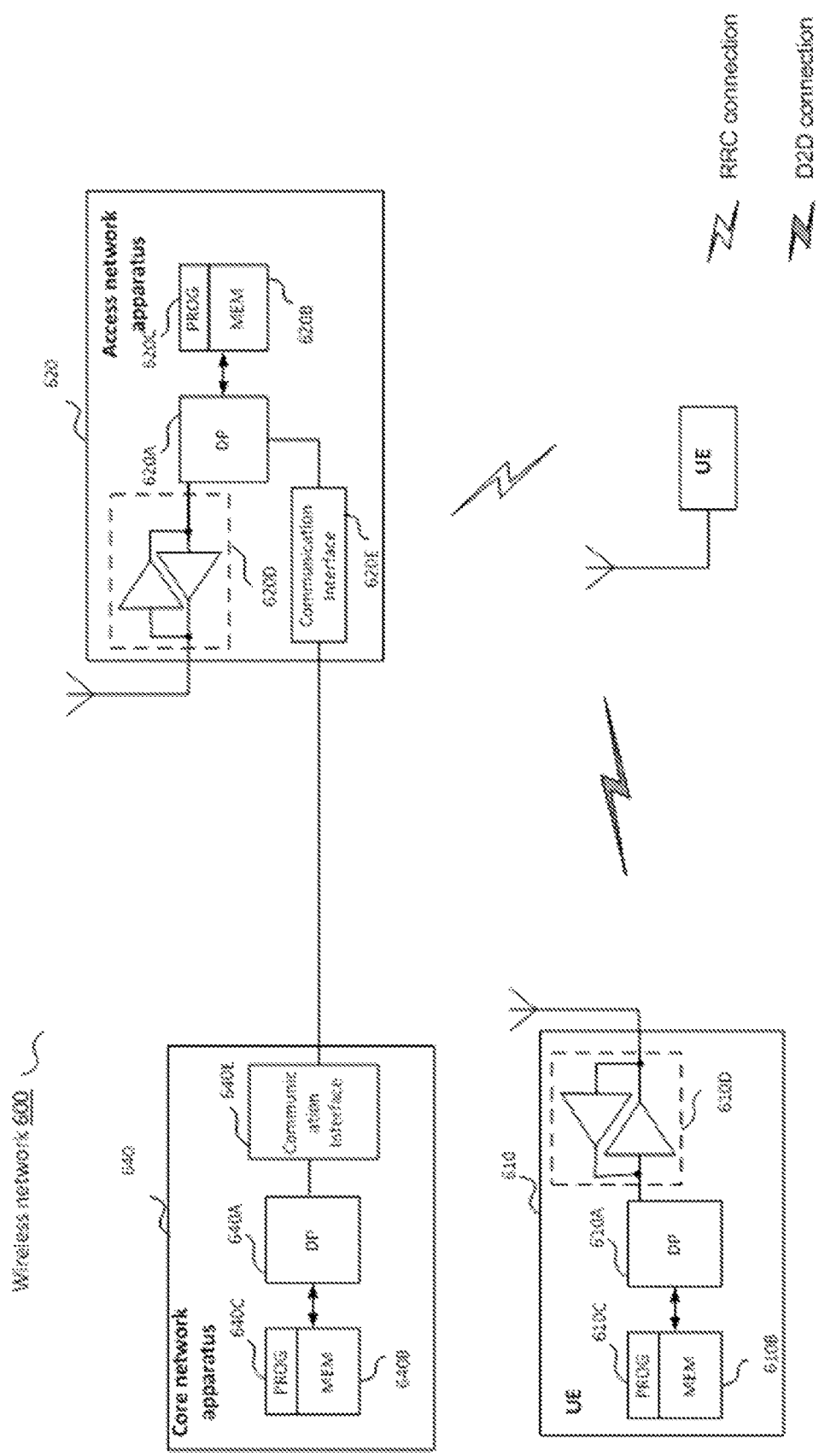
FIG. 6 is a simplified block diagram of various devices that are suitable for use in practicing various exemplary embodiments of the present invention.

FIGS. 3, 4, and 5, are logic flow flowcharts that illustrate the operations of methods, and a result of executions of computer program instructions, in accordance with the example embodiments of this invention for key generations for a network-controlled D2D communication. More specifically, FIGS. 3, 4, and 5 are descriptive of a process flow between a D2D peer user equipment, such as the UE1 and UE2, an access network apparatus such as eNB 122 or DRSF 124, and a core network apparatus, such as the MME 132. In such an embodiment, the processes can be implemented in, for instance, a chip set including a processor and a memory as shown in FIG. 6. As such, a user equipment can provide means for accomplishing various parts of the process 300 as well as means for accomplishing other processes in conjunction with other components, an access network apparatus can provide means for accomplishing various parts of the process 400 as well as means for accomplishing other processes in conjunction with other components, and a core network apparatus can provide means for accomplishing various parts of the process 500 as well as means for accomplishing other processes in conjunction with other components.

In step 310, a user equipment (such as UE1 110A) derives a first key based on a first security parameters and a key shared between a core network apparatus (e.g. MME 132) and the user equipment, such as UE1's $K_{asme}$. UE1 can send a request message to MME 132 for a generation of the first key. The request can indicate a capability of D2D communication of UE1. In response to the request, UE1 can receive from MME 132 the first security parameters, such as a random number.

In step 320, UE1 sends a notification of D2D services to its peer user equipments, such as UE2. UE1 may stay in idle mode. The notification of D2D services can be broadcasted in physical layer beacons to UE2, and the beacons can identify UE1 as an originator of D2D services.

Next in step 330, UE1 receives a second security parameter from its peer user equipments (such as UE2), which want to establish a D2D connection with UE1. The second security parameter is a parameter for generating a second key based on the first key by an access network apparatus (such as eNB 122 or DRSF 124) to which UE1 is registered. The second security parameter can include a random number provided by the access network apparatus, and/or a temporary identity of the peer user equipment UE2. UE1 can be registered to eNB 122 or DRSF 124 with its location information of D2D registration area.

Next in step 340, UE1 derives the second key based on the second security parameter and the first key. The second key is to be used for protecting a D2D communication between UE1 and its peer user equipment. UE2 can obtain the second key directly from the access network apparatus. Then, a D2D connection can be established between UE1 and UE2, and the D2D communications between UE1 and UE2 can be secured based on the second key.

In step 410, an access network apparatus (such as eNB 122 or DRSF 124) obtains from a core network apparatus (such as MME 132) a first key for a D2D user equipment (such as UE1), and store the first key. The first key is shared between UE1 and MME 132 for D2D communications of UE1. UE1 can be an D2D user equipment within a D2D registration area managed by eNB 122 or DRSF 124. Through accepting a registration of UE1, eNB 122 or DRSF 124 can store the first key in associated with a location information of D2D registration area of UE1.

In step 420, the access network apparatus (such as eNB 122 or DRSF 124) receives from another user equipment (such as UE2), a request for generating a second key for a D2D communication between UE1 and the second user equipment. The request can indicate to eNB 122 or DRSF 124 that the second key is to be used for a D2D communication between UE1 and UE2.

From the request, eNB 122 or DRSF 124 can identify UE1's identity and retrieve $K_{d2d-UE1}$. Based on the $K_{d2d-UE1}$ and some security parameters, such a random number or UE2's temporary identity S-TMSI, eNB 122 or DRSF 124 can generate the second key in response to the request, at step 430.

Next in step 440, eNB 122 or DRSF 124 send the second key to the another user equipment UE2. The security parameters used for generating the second key can also be sent to UE2, so that the security parameters can be forwarded to UE1.

In step 510, a core network apparatus (such as MME 132) receives a request for generating a first key for D2D communications of a user equipment (such as UE1). The request can indicate a capability of UE1's D2D communication. Next in step 520, in response to the request, MME 132 can generate the first key based on a key (such as UE1's $K_{asme}$) shared between MME 132 and UE1 and some security parameters, such as a random number provided by MME 132.

Next in step 530, MME 132 sends the security parameters to UE1, so that UE1 can derive the first key. In step 540, MME 132 further sends the first key to an access network apparatus, such as eNB 122 and DRSF 124, to which UE1 is registered. With the sharing of the first key between UE1 and the access network apparatus, the generation of keys (i.e. the second key) for D2D services of UE1 can be terminated in the access network by the access network apparatus, without interrupting the core network.

Now reference is made to FIG. 6 illustrating a simplified block diagram of various electronic devices that are suitable for use in practicing the exemplary embodiments of the present invention. In FIG. 6, a wireless communication network 600 may be adapted for communication with user equipments 610 (such as UEs 110A and 110B) via a base station (such as an eNB 122). The network 600 may further include an access network apparatus 620 (such as eNB 122 or DRSF server 124) for key generations of a D2D service, and a core network apparatus 640 (such as MME 132) for providing a NAS security for the user equipments. The UEs 110A and 110B can perform a cellular communication under the control of MME 132 and the eNB 122. Furthermore, the UE1 110A and UE2 110B can perform a D2D communication directly between each other under the control of MME 132 and the eNB 122, and optionally a DSRF server 124. The keys for D2D services can be generated for UEs without introducing too much burden to a core network according to the exemplary embodiments of the present invention as discussed above.

The UE 610 includes a data processor (DP) 610A, a memory (MEM) 610B that stores a program (PROG) 610C, and a suitable radio frequency (RF) transceiver 610D for wireless communications with the eNB via one or more antennas. In an exemplary embodiment, the transceiver 610D in the UE1 110A can be used for D2D communications in both licensed band (e.g. cellular band) and unlicensed band (e.g. WLAN band). Alternatively, the transceiver 610D can comprise separate components to support D2D communications in licensed band (e.g. cellular band) and unlicensed band (e.g. WLAN band) respectively.

The access network apparatus 620 includes a DP 620A, a MEM 620B that stores a PROG 620C, and a suitable communication interface 620E. The communication interface 620E may be able to communicate with the core network, such as MME 132. In some implementations that the access network apparatus 620 is implemented as a DRSF server, the communication interface 620E can be further adapted to communicate with UEs via eNB. In some examples, the communication interface 620E may be used to transmit and receive information using protocols and methods associated with the network-controlled D2D communication. In some embodiments where the access network apparatus 620 is implemented as an eNB, or in other words that a DRSF is incorporated into eNB, the access network apparatus 620 can further includes a suitable radio frequency (RF) transceiver 620D for wireless communications with the UEs via one or more antennas.

The core network apparatus also includes a DP 640A, a MEM 640B that stores a PROG 640C, and a suitable communication interface 640E. The communication interface 640E may be able to communicate with eNB and with UE1 and UE2 via eNB. In some embodiments, the communication interface 640E is further adapted to communicated with a DRSF server. In some examples, the communication interface 640E may be used to transmit and receive information using protocols and methods associated with the network-controlled D2D communication.

At least one of the PROGs 610C, 620C, 640C is assumed to include program instructions that, when executed by the associated DP, enable the electronic device to operate in accordance with the exemplary embodiments of this invention, as discussed above. That is, the exemplary embodiments of this invention may be implemented at least in part by computer software executable by the DP 610A of the UE 610A, by the DP 620A of the access network apparatus 620, and by the DP 640A of the core network apparatus 640, or by hardware, or by a combination of software and hardware. The basic structure and operation of UE 610, the access network apparatus 620 (e.g. eNB 122 or DRSF 124), and the core network apparatus 640 (e.g. MME 132) are known to one skilled in the art.

In general, the various embodiments of the UE 610 can include, but are not limited to, cellular telephones, personal digital assistants (PDAs) having cellular wireless communication capabilities, portable computers having cellular wireless communication capabilities, image capture devices such as digital cameras having wireless communication capabilities, gaming devices having cellular wireless communication capabilities, music storage and playback appliances having cellular wireless communication capabilities, Internet appliances permitting cellular wireless Internet access and browsing, as well as portable units or terminals that incorporate combinations of such functions.

The MEMs 610B, 620B, 640B may be of any type suitable to the local technical environment and may be implemented using any suitable data storage technology, such as semiconductor based memory devices, flash memory, magnetic memory devices and systems, optical memory devices and systems, fixed memory and removable memory. The DPs 620A, 620A, 640A may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

It should be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present invention includes any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-Limiting and exemplary embodiments of this invention.

What is claimed is:

1. An apparatus comprising:
   at least one computer processor; and
   at least one memory including computer program code,
   the at least one memory and the computer program code configured to, with the at least one processor, cause the apparatus to perform at least the following:
   send a request message to a core network apparatus, indicating a capability of device-to-device communication of a first user equipment;
   receive a first security parameters from the core network apparatus;
   derive at the first user equipment, a first key based on the first security parameters and a key shared between the core network apparatus and the first user equipment;
   send a notification of device-to-device services to a second user equipment;
   receive a second security parameter from the second user equipment, wherein the second security parameter is a parameter for generating a second key based on the first key by an access network apparatus to which the first user equipment is registered;
   derive at the first user equipment, the second key based on the second security parameter and the first key, for protecting a device-to-device communication between the first user equipment and the second user equipment.

2. The apparatus of claim 1, wherein the first user equipment returns to idle mode after receiving the first security parameters.

3. The apparatus of claim 1, wherein the apparatus is further caused to register the first user equipment to the access network apparatus with a location information of device-to-device registration area of the first user equipment.

4. A method, comprising:
   sending, by a first user equipment, a request message to a core network apparatus, indicating a capability of device-to-device communication of a first user equipment;
   receiving a first security parameters from the core network apparatus;
   deriving at the first user equipment, a first key based on the first security parameters and a key shared between the core network apparatus and the first user equipment;
   sending a notification of device-to-device services to a second user equipment;
   receiving a second security parameter from the second user equipment, wherein the second security parameter is a parameter for generating a second key based on the first key by an access network apparatus to which the first user equipment is registered; and
   deriving at the first user equipment, the second key based on the second security parameter and the first key, for protecting a device-to-device communication between the first user equipment and the second user equipment.

5. A method of claim 4, wherein the first user equipment returns to idle mode after receiving the first security parameters.

6. A method of claim 4, further comprises:
   registering the first user equipment to the access network apparatus with a location information of device-to-device registration area of the first user equipment.

7. A non-transitory computer-readable storage medium carrying one or more sequences of one or more instructions which, when executed by one or more processors, cause operations of at least the following:
   sending a request message to a core network apparatus, indicating a capability of device-to-device communication of a first user equipment;

receiving a first security parameters from the core network apparatus;

deriving at the first user equipment, a first key based on the first security parameters and a key shared between the core network apparatus and the first user equipment;

sending a notification of device-to-device services to a second user equipment;

receiving a second security parameter from the second user equipment, wherein the second security parameter is a parameter for generating a second key based on the first key by an access network apparatus to which the first user equipment is registered; and deriving at the first user equipment, the second key based on the second security parameter and the first key, for protecting a device-to-device communication between the first user equipment and the second user equipment.

8. The computer-readable storage medium of claim 7, when executed by one or more processors, cause further operation at the first user equipment to return to idle mode after receiving the first security parameters.

9. The computer-readable storage medium of claim 7, when executed by one or more processors, cause further operation of:

registering the first user equipment to the access network apparatus with a location information of device-to-device registration area of the first user equipment.

\* \* \* \* \*